United States Patent [19]
Hankins et al.

[11] Patent Number: 5,755,926
[45] Date of Patent: May 26, 1998

[54] INTEGRATED PULPING PROCESS OF WASTE PAPER YIELDING TISSUE-GRADE PAPER FIBERS

[75] Inventors: Charles W. Hankins, Aston, Pa.; Oldrich C. Prochazka, Wilmington, Del.; John F. Schmitt, West Chester, Pa.

[73] Assignee: Kimberly-Clark Worldwide, Inc., Neenah, Wis.

[21] Appl. No.: 795,462

[22] Filed: Feb. 4, 1997

Related U.S. Application Data

[63] Continuation of Ser. No. 698,414, Aug. 15, 1996, abandoned, which is a continuation of Ser. No. 588,093, Jan. 18, 1996, abandoned, which is a continuation of Ser. No. 491,509, Jun. 16, 1995, abandoned, which is a continuation of Ser. No. 179,214, Jan. 10, 1994, abandoned, which is a continuation of Ser. No. 840,370, Feb. 2, 1992, abandoned.

[51] Int. Cl.$^6$ .................................... D21C 5/02
[52] U.S. Cl. ................... 162/6; 162/8; 162/21
[58] Field of Search .................. 162/5, 6, 8, 21, 162/65

[56] References Cited

U.S. PATENT DOCUMENTS

| | | | |
|---|---|---|---|
| 366,700 | 7/1887 | Stevens | 162/8 |
| B 491,673 | 2/1976 | Lausch | 162/5 |
| 988,874 | 4/1911 | Henkel et al. | 162/6 |
| 1,112,887 | 10/1914 | Burby | 162/8 |
| 1,138,085 | 5/1915 | Cline et al. | 162/8 |
| 1,326,849 | 12/1919 | Crocker | 162/8 |
| 1,424,411 | 8/1922 | Jespersen | 162/8 |
| 1,545,707 | 7/1925 | Stutzke | 162/8 |

(List continued on next page.)

FOREIGN PATENT DOCUMENTS

| | | |
|---|---|---|
| 545113 | 8/1957 | Canada . |
| 663547 | 5/1963 | Canada . |
| 684453 | 4/1964 | Canada . |
| 719622 | 10/1965 | Canada . |
| 0013758 | 8/1980 | European Pat. Off. . |
| 247934 | 7/1987 | German Dem. Rep. . |

(List continued on next page.)

OTHER PUBLICATIONS

Markham et al "Oxygen Bleaching of Secondary Fiber Grades" TAPPI Dec. 1988 pp. 168–174.
Angulo "Environmentally Safe Bleaching of Post Consumer Waste" TAPPI Pulping Conference, Oct. 1990.
Stephenson "Preparation & Treatment of Wood Pulp" vol. 1 pp. 455, 456, 467, 1950.
"New Technology Explodes On The Recycling Scene", American Papermaker, Mar. 1991, pp. 34–35.
"Oxidative Cleaning and Bleaching of Secondary Fibers", Naddeo et al., Wastepaper II Conference, 22 May 1991, Chicago, IL., pp. 1–10.
"Oxygen bleaching of secondary fiber grades", Tappi Journal, Dec. 1988, pp. 168–174.
"Upgrading of pulp from corrugated containers by oxygen delignification", Tappi Journal, Jun. 1986, pp. 100–103.
RD 376048, Aug. 10, 1995, Abstract.

Primary Examiner—Karen M. Hastings
Attorney, Agent, or Firm—James E. Ruland

[57] ABSTRACT

This invention provides an integrated system for recovering fibers from mixed grades of waste paper and simultaneously cleaning (deinking) waste fibers. The system comprises a mild alkaline pulping process with oxygen and hydrogen peroxide followed by rapid decompression of fibers and then by hot washing.

11 Claims, 1 Drawing Sheet

U.S. PATENT DOCUMENTS

| | | | |
|---|---|---|---|
| 1,585,092 | 5/1926 | Granton | 162/5 |
| 1,601,193 | 9/1926 | Welsh | 162/5 |
| 1,727,722 | 9/1929 | Lewis | 162/6 |
| 1,782,382 | 11/1930 | Eggers | 162/6 |
| 1,925,372 | 9/1933 | Darling | 92/13 |
| 1,975,771 | 10/1934 | Davis et al. | 92/20 |
| 1,988,363 | 1/1935 | Snyder | 92/9 |
| 2,013,841 | 9/1935 | Richter | 92/20 |
| 2,200,622 | 5/1940 | Hines | 92/13 |
| 2,525,594 | 10/1950 | Fennell | 92/1.5 |
| 2,582,496 | 1/1952 | Massey et al. | 92/1.5 |
| 2,977,274 | 3/1961 | Hollis | 162/4 |
| 3,056,713 | 10/1962 | Gartner | 162/5 |
| 3,058,871 | 10/1962 | Davis et al. | 162/5 |
| 3,248,277 | 4/1966 | Gartner | 162/5 |
| 3,427,217 | 2/1969 | Miller | 162/6 |
| 3,573,202 | 3/1971 | Sobota et al. | 210/5 |
| 3,652,385 | 3/1972 | Noreus et al. | 162/23 |
| 3,832,276 | 8/1974 | Roymoulik et al. | 162/65 |
| 3,833,460 | 9/1974 | Iannazzi et al. | 162/5 |
| 3,891,497 | 6/1975 | Daane et al. | 162/6 |
| 3,932,206 | 1/1976 | Illingworth et al. | 162/5 |
| 4,013,505 | 3/1977 | Balcar et al. | 162/5 |
| 4,161,421 | 7/1979 | Sherman | 162/18 |
| 4,264,412 | 4/1981 | Hasler et al. | 162/4 |
| 4,272,315 | 6/1981 | Espenmiller | 162/4 |
| 4,276,118 | 6/1981 | Quick | 162/5 |
| 4,343,679 | 8/1982 | DeCeuster et al. | 162/4 |
| 4,381,969 | 5/1983 | DeCeuster et al. | 162/5 |
| 4,390,395 | 6/1983 | DeCeuster et al. | 162/5 |
| 4,416,727 | 11/1983 | Elton et al. | 162/6 |
| 4,451,331 | 5/1984 | Raggam et al. | 162/18 |
| 4,462,864 | 7/1984 | Carles et al. | 162/56 |
| 4,487,655 | 12/1984 | Noetzel et al. | 162/5 |
| 4,518,459 | 5/1985 | Freis et al. | 162/5 |
| 4,521,336 | 6/1985 | Dilling | 530/501 |
| 4,534,741 | 8/1985 | Farrall | 445/3 |
| 4,568,420 | 2/1986 | Nonni | 162/65 |
| 4,586,982 | 5/1986 | Poppel et al. | 162/5 |
| 4,618,400 | 10/1986 | Wood et al. | 162/5 |
| 4,737,238 | 4/1988 | de Ruvo | 162/4 |
| 4,780,179 | 10/1988 | Clement | 162/5 |
| 4,798,651 | 1/1989 | Kokta | 162/22 |
| 4,859,362 | 8/1989 | Schilling | 252/312 |
| 4,915,785 | 4/1990 | Siminoski et al. | 162/78 |
| 4,935,096 | 6/1990 | Gallagher et al. | 162/5 |
| 4,959,123 | 9/1990 | Lehmann et al. | 162/5 |
| 4,971,656 | 11/1990 | Lehmann et al. | 162/5 |
| 5,011,572 | 4/1991 | Parthasarathy | 162/65 |
| 5,039,377 | 8/1991 | von Raven et al. | 162/78 |
| 5,211,809 | 5/1993 | Naddeo et al. | 162/6 |
| 5,213,661 | 5/1993 | Naddeo et al. | 162/7 |
| 5,221,433 | 6/1993 | Daute et al. | 162/5 |
| 5,223,089 | 6/1993 | Kato | 162/5 |
| 5,227,019 | 7/1993 | Borchardt | 162/6 |
| 5,228,953 | 7/1993 | Bast et al. | 162/5 |
| 5,234,544 | 8/1993 | Naddeo | 162/5 |
| 5,234,545 | 8/1993 | Fabry et al. | 162/7 |
| 5,262,003 | 11/1993 | Chupka et al. | 162/4 |
| 5,277,760 | 1/1994 | Fongen | 162/6 |
| 5,286,346 | 2/1994 | Engelskirchen et al. | 162/8 |
| 5,296,097 | 3/1994 | Friend | 162/18 |
| 5,302,244 | 4/1994 | Nguyen | 162/6 |
| 5,302,245 | 4/1994 | Nadeau | 162/8 |
| 5,308,448 | 5/1994 | Behler et al. | 162/7 |
| 5,324,390 | 6/1994 | Naddeo et al. | 162/6 |
| 5,332,471 | 7/1994 | Naddeo et al. | 162/6 |
| 5,338,401 | 8/1994 | Naddeo et al. | 162/6 |
| 5,358,185 | 10/1994 | Konecsny | 241/18 |
| 5,360,512 | 11/1994 | Blum | 162/8 |
| 5,362,363 | 11/1994 | Smolka et al. | 162/8 |
| 5,385,639 | 1/1995 | Hou et al. | 162/5 |
| 5,397,434 | 3/1995 | Costa et al. | 162/4 |
| 5,401,360 | 3/1995 | Galland | 162/8 |
| 5,460,695 | 10/1995 | Kato | 162/5 |

FOREIGN PATENT DOCUMENTS

| | | |
|---|---|---|
| 74-037721 | 10/1974 | Japan . |
| 57-025488 | 2/1982 | Japan . |
| 59-021791 | 2/1984 | Japan . |
| 86-011353 | 4/1986 | Japan . |
| 2-053987 | 2/1990 | Japan . |
| 92/008554 | 2/1992 | Japan . |
| 4-163386 | 6/1992 | Japan . |
| 4-163387 | 6/1992 | Japan . |
| 4-202878 | 7/1992 | Japan . |
| 4-222284 | 8/1992 | Japan . |
| 5-051888 | 3/1993 | Japan . |
| 5-140884 | 6/1993 | Japan . |
| 6-123088 | 5/1994 | Japan . |
| 6-248588 | 9/1994 | Japan . |
| 95/042671 | 5/1995 | Japan . |
| 90/7009 | 5/1992 | South Africa . |
| 991367 | 5/1965 | United Kingdom . |
| 2200928 | 8/1988 | United Kingdom . |
| 82/01019 | 4/1982 | WIPO . |
| 87/03023 | 5/1987 | WIPO . |
| 88/06201 | 8/1988 | WIPO . |
| 94/23117 | 10/1994 | WIPO . |
| 95/11334 | 4/1995 | WIPO . |

5,755,926

INTEGRATED PULPING PROCESS OF WASTE PAPER YIELDING TISSUE-GRADE PAPER FIBERS

This application is a continuation of application Ser. No. 08/698,414 entitled "Integrated Pulping Process of Waste Paper Yielding Tissue-Grade Paper Fibers" and filed in the U.S. Patent and Trademark Office on Aug. 15, 1996 now abandoned, which is a continuation of application Ser. No. 08/588,093 filed Jan. 18, 1996, now abandoned, which is a continuation of application Ser. No. 08/491,509 filed Jun. 16, 1995, now abandoned which is a continuation of application Ser. No. 08/179,214 filed on Jan. 10, 1994, now abandoned, which is a continuation of Ser. No. 07/840,370 filed on Feb. 24, 1992, now abandoned.

BACKGROUND OF THE INVENTION

1. Field of the Invention

This invention relates to a recycling process for waste materials containing cellulosic fibers that yields high quality tissue-grade cellulosic fibers.

In particular, this invention provides a process for simultaneously cleaning and reclaiming high quality cellulosic fibers and delignifying low quality cellulosic fibers contained in a mixture of waste materials such as office waste paper, used newsprint, and old corrugated boxes. The process includes mild alkaline digestion to delignify high kappa number fibers without degrading low kappa number, i.e. high quality fibers contained in mixed grades of waste papers. The mild alkali digestion is followed by rapid decompression of the fiber mixture in the presence of solubilized lignin surfactants produced during alkaline digestion. Decompression is promptly followed by hot water washing while the fibers are still hot from the mild alkaline digestion and blow steps. The process yields a quality cellulosic fiber having a low Kappa number. The process steps of the invention can be combined with conventional paper recycling steps such as trash/plastic separation, and bleaching to yield a sanitary, quality fiber suitable for making tissue products, such as toilet and facial tissues, paper towels, and napkins.

2. Description of the Prior Art

Landfilling of solid waste is reaching a crisis with recycling of waste materials providing one means of reducing the solid waste problem. Paper, cardboard, boxes and similar cellulosic fiber containing waste are usually collected as a mixture of various waste grades with each component having different fiber characteristics. Sorting of such waste into similar fiber components prior to recycling is very expensive but produces homogenous waste that can be recycled into useful fiber representative of the starting material. Recycling of mixed grades of waste provides a fiber mixture that reflects the mixture of waste materials in the starting mixture which results in a fiber mixture not suitable for making products representative of the higher quality fiber products in the mixture because of the presence of lower quality fibers that are unsuitable for such products. For a typical mixture containing newspapers, box board, magazines, used white paper, corrugated boxes, paper bags and/or envelopes, the fibers in the mixture vary greatly in key fiber properties such as brightness, length, freeness and lignin content as measured by kappa number. Such a fiber mixture is not very suitable in a process manufacturing tissue products. For example, high strength, low kappa number fibers having high brightness are the most valuable and are suitable for tissue products but such fibers are only a fraction of the fibers in mixed waste paper grades. Fibers from corrugated and box grade fractions of mixed waste paper grades contain high kappa # fibers. Additional pulping and bleaching of such high kappa number (high lignin) fibers with chemicals would, if done in the presence of already low kappa, high brightness fibers, degrade such higher quality fibers. Such degradation would be manifested by a decrease in the properties of the fibers. Prior recycling operation have sought the capability of reducing the kappa number of fibers (pulp) from corrugated and box grades for increased strength and brightness without degrading the valuable low kappa number, high brightness fibers found in whiter grades of waste paper such as mixed office waste. Such a process would be capable of producing uniform high strength and brightness fibers from mixed wastes without the need to separate the different types of waste materials prior to recycling. The present invention provides such a process.

Contaminates are another problem encountered in recycling fibers from mixed waste materials. The need for the prior art process to classify, grade, and separate waste paper and to decontaminate and clean (e.g., deink) in order to obtain a uniform fiber product have made recycling difficult. The need for methods to process all secondary (waste) fibers together is therefore great.

The prior art is replete with attempts to solve this vexing problem.

For example, in U.S. Pat. No. 2,977,274—Hollis, three major types of waste paper are classified by group of contaminants: (1) non-fibrous materials, such as dirt, rubber, metal, or wood; (2) non-soluble materials, such as inks, clay, or pigments, and (3) polymeric materials, such as wax, plastics, tars, gums, or asphalt. Fiber degradation is explained in relation to recycling.

Often, industry pre-separates the supply of waste paper into uniform grades by fiber type and selects a different pulping process for each grade. Examples of such specific processes is U.S. Pat. No. 4,276,118—Quick, which discloses a deinking process for used photocopy paper.

Other prior art processes solved specific problems. U.S. Pat. No. 4,264,412—Hasler, et al discloses a fiber recovery specific for pressure-sensitive carbonless copying paper; U.S. Pat. No. 4,272,315—Espenmiller discloses a secondary fiber process for waste paper containing plastic and other floatable trash which is removed by mechanical means; U.S. Pat. No. 3,058,821; —Davis, et al describes a chemical solvent process also for pulping waste paper containing plastic, waxes, and the like; U.S. Pat. No. 3,573,202—Saboda, et al recognizes the need to select, separate, and grade the waste material supply and addresses the issue of contamination by-product resulting from a typical secondary fiber pulping process; U.S. Pat. No. 3,833,460—Iannazi, et al discloses a method of separating mixtures of waste paper into two components and effecting separation; U.S. Pat. No. 4,959,123—Lehmann, et al addresses only the problem of de-inking printed waste paper by treatment of paper pulp in a pulper under alkaline pH values; WO 82/01019 (Pct/5E81/00273)—Sunds Defibrator, in claiming a method of producing pulp from variant vegetable-cellulose containing fibrous material, discloses the desirability of being able to utilize wastes from traditional woodworking industries, such as sawmill waste and tropical kinds of wood. The pulping is restricted, however, to first or virgin fiber sources; U.S. Pat. No. 4,798,651—Kokta discloses a process for preparing pulp suitable for papermaking disclosing an explosive decompression method from wood fragments as chips or shredded chips. Waste paper is not mentioned as a source of chips or shredded chips.

It is well known in the pulp industry that spent pulping liquors, known as black liquor in the kraft pulping process, which has been used to chemically solubilize lignin in ligno-cellulosic materials can be processed to recover surfactants, emulsifiers, and emulsion stabilizers. Descriptions of the preparation and end-uses of these types of compounds may be found more fully described in U.S. Pat. No. 4,534,741 to Dilling, U.S. Pat. No. 4,521,336 to Dilling, and U.S. Pat. No. 4,859,362 to Schilling.

The use of explosive decompression in pulping waste paper is described in a recent literature article (*American PaperMaker Mar.* 1991) wherein a steam explosion process to pulp paper waste is introduced by paper maker, Chesapeake Corporation, and steam digestion developer StakeTech. Alkaline pulping in the steam digester to produce surfactants from lignin which improve cleaning during explosive decompression is not taught in the reference, nor is hot washing without cooling of the pulp. Primarily a de-inking process or a pre-treatment step within a repulping system, waste fibers are digested at high pressure and temperatures and few minutes dwell time ending with instant pressure release. Thus, waste is converted to de-inked secondary fiber for further processing and is apparatus-dependent. Mild alkaline pulping requiring at least 30 minutes reaction time and moderate temperature and pressure to protect high quality fibers during digestion are not disclosed in the article.

A paper entitled "Oxidative Cleaning and Bleaching of Secondary Fibers" by Ron Naddeo, Ron Ruffer and Vincent Magnotta was presented at the Wastepaper II Conference on 22 May 1991 held in Chicago, Ill. That paper disclosed alkaline digestion of mixed grades of waste cellulosic materials with oxygen to achieve delignification and contaminant removal. Related technology that preceded such paper is disclosed in U.S. Pat. No. 4,416,727, inventors Edward F. Elton and Vincent Magnotta which discloses processes and apparatus for alkaline oxygen treatment of paper broke having wet strength resin for breaking down the resin to recover useful fibers. Equipment identified as items 32, 36, 38, 40 and 54 are particularly suitable for use in practicing the present invention steps of mild alkaline digestion with oxygen and peroxide followed by rapid decompression and washing.

U.S. Pat. No. 4,798,651 discloses an explosive pulping process that also discloses apparatus suitable for use in the present invention. Said patent teaches antioxidant chemicals during pulping rather than oxygen or peroxide as used in the present invention.

Waste paper is well known and comes from many different sources and in many different grades. For example, waste paper obtained from an office or commercial enterprise may contain newsprint, magazines, laser and xerox printed documents, bags, boxes, etc. The production of high quality tissue-grade paper from waste paper requires the removal of contaminants, such as stickies, inks, and dirt. "Stickies" consist primarily of organic adhesives used in the paper converting industry, such as hot melts, pressure-sensitive adhesives, styrofoam, and lattices. Typical stickies include: polyvinyl acetate (PVA) polymers and copolymers, ethylene vinyl acetate (EVA) polymers and copolymers, polystyrene, styrene-butadiene, polypropylene, polyethylene, polyamide, latex and other rubber compounds, wax, and the like. A particularly common source of stickies is the tackifiers which are added to paper products to improve adhesion properties.

As will be seen from the description and illustrations to follow, none of the above-identified references disclose or anticipate the combination of features realized by the integrated process of the present invention for the deinking, cleaning, bleaching and conversion of waste cellulosic fibers from variant sources into high quality tissue grade paper. In the description which follows, all proportions including percentages are by weight and chemical proportions are based upon the oven dried weight of the cellulosic fibers unless indicated otherwise. Whenever a pH is specified for a pulp slurry, initial pH exhibited at the time the slurry is prepared is intended unless indicated otherwise.

SUMMARY OF THE INVENTION

This invention provides an integrated system for recovering fibers from mixed grades of waste paper and simultaneously cleans, deinks and decontaminates waste fibers. The system comprises a mild alkaline pulping process with oxygen and hydrogen peroxide followed by rapid decompression of fibers and then hot washing that: (A) produces a high grade fiber suitable for making tissue grade and other high quality (e.g. fine) paper from waste grades containing such fibers; (B) simultaneously delignifies lower grade fibers contained in other grades of waste to make bleachable low Kappa number fibers without substantial degradation of the high grade fibers by chemically attacking lignin in lower grade fibers to solubilize the lignin and convert the lignin into surfactants helpful in cleaning and deinking used fibers; and, (C) cleans and deinks fibers with the surfactant properties of the solubilized lignin.

DETAILED DESCRIPTION OF THE INVENTION

Figure 1:
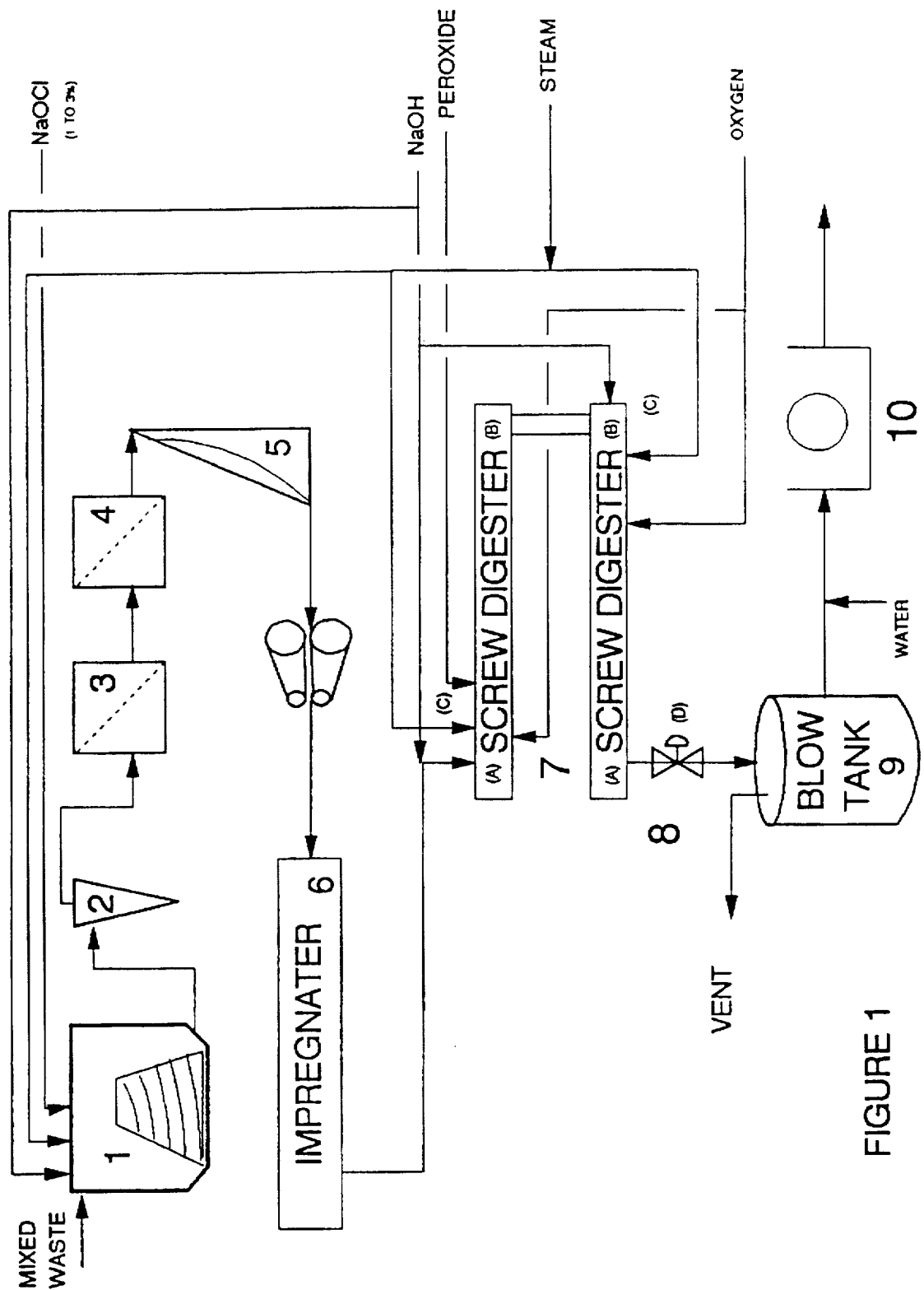
FIG. 1 schematically depicts the process of the present invention.

The present invention provides an integrated pulping system capable of pulping mixed grades of waste paper material to produce in high yields a clean, sanitized fiber without sacrificing the quality or strength or color which is suitable for use in prime quality sanitary tissue applications.

The crux of the present invention lies in the application of a unique alkaline digestion and decompression operation with oxygen and peroxide which separates fibers, delignifies and bleaches fibers and produces lignin surfactants during digestion that aid in the separation of contaminants, such as inks, ash, plastics, microorganisms etc. from the fibers contained in the waste cellulosic materials. This operation enables waste cellulosic material from any waste source to be processed together in a digestion-decompression operation from where it emerges in a form easily washed and bleached into high quality paper grade fibers.

Table 1 lists the types of waste paper grades in a typical bale of mixed grades of waste cellulosic materials which may be readily processed by the present invention. Listed are the waste grades often found in a bale of mixed waste with descriptions of the fiber content of each grade in terms of Kappa # range. Waste cellulosic fibers of mixed origin, are usually received in the bale form. "Mixed Grades of Waste Cellulosic Materials", as the term is used herein means a mixture of cellulosic fibers of different qualities contained in waste materials with at least 80% of the waste material being the specific grades of waste material listed in Table I, and having a Kappa number for a representative mixture of fibers in the Mixed Grades of Waste Cellulosic Materials above 5 and less than 80 and often in the range of 13 to 25 and a dirt number above 800 parts per million (ppm)

as determined by the Scott-Optomax V method described hereinafter. A current standard grade available commercially in the United State is called "Mixed Paper" and defined by the Paper Stock Institute in Scrap Specification Circular 1990 Guidelines for Paper Stock: PS-90 Export Transactions. That commercial grade known as Mixed Papers meets the definition of "Mixed Grades of Cellulosic Materials" as defined herein. The mixture has fibers having a Kappa # above 50 and fibers having a Kappa # below 5. Recent changes in corrugated containers (OCC) has resulted in the center or corrugated portion containing a mixture of recycled fibers some of which have a Kappa # below 50 while the outer layers are usually strong, high Kappa # fibers (e..g. above about 100). Therefore, it is now possible for used Corrugated Containers (OCC) to have a mixture of fibers that is within the above definition on "Mixed Grades of Waste Cellulosic Materials" and therefore within the scope of the claimed invention.

TABLE I

| Waste Grade | Kappa # Range |
| --- | --- |
| Corrugated Containers | 60 to 130 |
| News | 50 to 140 |
| Mixed Papers | 0 to 80 |
| Computer Printout | 0 to 25 |
| Coated Book Stock | 0 to 15 |
| Used Brown Kraft | 30 to 50 |
| Publication Blanks | 40 to 80 |
| Sorted Colored Ledger | 0 to 15 |
| Sorted White Ledger | 0 to 15 |
| Manila Tabulating Cards | 40 to 70 |

Baled material is shredded and made into a pulp slush according to conventional means for use in the present invention. For example, shredded mixed waste paper can be prepared for use in the digester by feeding dry shredded waste paper into a pulper. The shredding is preferably accomplished as follows: broken bales of paper are conveyed past a metal trap to a pair of shredders in series. From the shredders it is air-blown into a cyclone separator where dust is removed. From the cyclone separator the finely shredded fibers are belt-conveyed past a second magnetic trap to a predigester tub with 1% to 5% NaOH and maintained at a temperature of 20° C. to 95° C. for a period of 2 to 10 minutes. The caustic pretreated fibers are adjusted to a pulp consistency above 10 and preferably 15% to 40% (pulp consistency is calculated on the air dried weight of the fibers) are now ready for introduction into the pressure digester shown as screw digesters (7) in FIG. 1.

FIG. 1 depicts baled waste paper being broken open and placed into a high-consistency pulper (1) where it is preferably treated with 1% to 5% NaOH at a temperature of 40° C. to 70° C. for 10 to 40 minutes. About 3% to 10% NaOCl may be added if needed to activate the lignin content, thus making it more soluble when placed in the digester. From the pulper, the caustic-treated fibers are preferably subjected to cleaning and screening in a high consistency (3% to 4%) centri-cleaner (2) and coarse and fine screeners (3 and 4) respectively. The fibers are then preferably washed at high temperature (5) and thickened and treated with from 2% to 10% NaOH, and heated to between 20° C. and 95° C. for 1 to 10 minutes in an impregnator (6). The fibers from the impregnator (6) are raised to a pulp consistency of above about 10% and preferably 25% to 35% for introduction into the process of the present invention depicted in FIG. 1 as screw digesters (7), blow valve (8) vented blow tank (9) and pulp washer (10).

The crucial operative step in the process of the present invention lies in the alkaline $O_2$ digestion-decompression with hydrogen peroxide. In this stage, pulp slurry, preferably pre-treated as discussed above, and at a consistency of at least 10% and preferably about 25% to 30%, are introduced into the digester such as a Chemi-Pulper® reaction tube manufactured by The Black Clawson Co. The preferred method of adding the slurry to the digester is a positive displacement high consisting pulp such as an Ingersol Rand pump. The preferred digester-decompressor system consists of two cylindrical reaction tubes such as a Chemi-Pulper® arranged in series and equipped with screw-feed capability and with means for addition of chemicals and steam into each reaction tube or to pulp entering a reaction tube. Discharge of pulp from the reaction tube is by means for rapidly decompressing the pulp from the pressure in the digester to approximately atmospheric pressure. A pressure reduction orifice or valve sized for the throughput of the reaction tube and the size of the blow tank is suitable. The decompression means is for discharging the chemically treated fiber rapidly through a pressure differential of about 60 psi or more. The pressure differential is from the pressure in the reaction tubes to the reduced pressure (essentially atmospheric pressure) in a blow tank. To avoid plugging of the decompression valve or orifice, the pulp is preferably diluted with warm water (i.e. above 70° C.) to a consistency of less than 8% and preferably 5% to 8%. From the blow tank, the pulp must be washed with hot water (above about 70° C.) while the pulp is still at a temperature above about 70° C. (158° F.).

Pretreatment of the shredded waste with mild caustic (NaOH) prior to the digestion-decompression step is preferred because it activates the lignin content of the fibers and causes the cells of the fibers to swell and become more receptive to treatment in the digester according to the process of the present invention. In the preferred pretreatment, the mixed grades of waste paper in shredded form are pretreated with alkali and water and pulped into a pulp slush having a pH above 8 and preferably between 9.5 and 11 and a consistency of above 6% and preferably between 11% and 13%. Also preferred is to preheat the slurry to above 40° C. with 40° C. to 70° C. being particularly preferred. Some pre-cleaning of the shredded pulp is also preferred such as removing dust and dirt with conventional apparatus such as a cyclone separator and also removal of magnetic particles as with a magnetic trap. Depending upon the types of waste paper or other materials in the bale, additional pretreatment chemicals and conditions may be utilized to promote softening and solubilizing of lignin. Preferably from 0.5% to 3% caustic is utilized in pre-treatment for adjusting pH. Preferably the alkali pretreated pulp is maintained at an elevated temperature (above 40° C.) for at least 5 minutes prior to being fed into the digester.

The lignin content of fibers as measured by the Kappa number (Ka#) contained in Mixed Grades of Waste Cellulosic Materials will vary depending upon the type and origin of waste fiber. Waste fibers obtained from old corrugated containers (OCC), brown kraft paper and the like, will have a very high lignin content (Kay>60 and typically over 100). On the other hand, waste material from such sources as used office waste such as used white paper and fax paper will have low lignin content fibers (Ka# <8 and usually 0–4). This wide variance in lignin characteristics is one of the primary reasons it has been difficult in the past to process together in one operation all types of waste cellulosic material and produce high quality, low Kappa number fibers.

The present invention reduces the lignin content of high lignin fiber component of mixed waste such as the fibers in OCC or groundwood waste materials to the extent necessary for the production of high quality fibers while simultaneously preserving the integrity (e.g., tensile strength or viscosity) of low lignin fibers such as fibers contained in office waste papers. The digestion and decompression (blowing) operation beneficially utilizes the solubilized lignin from the high lignin fibers as a surfactant to assist in de-inking and cleaning during the digestion, rapid decompression (blowing) and hot washing of the mixed fibers.

It has been found that by carefully regulating the process conditions in the digester in terms of temperature, pressure and type and quantities of chemicals that delignification of the high lignin content fibers (Kappa number fibers above 20 and often above 50) can be accomplished without substantial degradation of already low lignin fibers in the mixture. Mild alkali delignification with oxygen and hydrogen peroxide dissolves lignin to form alkali lignin compounds that have surfactant properties and when sulfur compounds are present, sodium lignosulfonate and/or thiolignosulfonate may also be formed which also act as surfactants in the reaction liquor. The formation of these surfactants serves to 1) increase the hydrophilicity of contaminants in the waste paper pulp such as dirt and ink, thereby avoiding agglomeration of these particles on the fibers and aids in the removal of these particles by hot washing, and 2) soften and separate the hydrophobic contaminants, such as adhesives and plastics, while increasing the ability of these particles to agglomerate and thus form bigger and easily removed particles while still hot by washing with warm water. It is critical to wash away such softened and agglomerated hydrophobic contaminants before they cool (<70° C.) and become reattached to the fibers. Therefore, the water used for washing must be sufficiently warm so as not to cool the pulp being washed to less than 70° C.

The digester, (preferably Chemi-Pulper® manufactured by The Black Clawson Company, Shartie-Pandia Division of Middletown, Ohio) is where mild alkali digestion of the Mixed Grades of Waste Cellulosic Materials takes place. The digester is operated at moderate temperatures and pressures, i.e., 70° C. to 110° C. and total pressures less than 135 pounds per square inch gauge (psig).

After being subjected to the process of the present invention, the Kappa # of the pulp mixture has been reduced by at least 50% to a Kappa # below 5 and preferably from 0 to 2.0 and a dirt level of less than 500 ppm dirt area after washing.

In the process of the present invention, the pre-treated mixture of high and low Kappa number fibers are subjected to a mild alkali digestion process to digest and solubilize lignin in a pressurized digester.

Mild alkali digestion requires hydrogen peroxide, an initial pH above 9.5 such as between 9.5 and 12.0 and preferably a pH from 10.0 to 11.5 (both initial and final pH), an $O_2$ partial pressure of greater than 65 pounds per square inch (psi) and preferably 80 psi to 100 psi and from about 0.5% to about 2.5% $H_2O_2$. The consistency should be above 10% and preferably about 15%.

The fiber pulp must be retained in the digester for at least 30 minutes, a temperature of at least 70° C. and a total pressure of less than about 135 psig and preferably 70 psig to 120 psig. If additional Kappa number reduction is needed, a second mild alkaline digestion can be done in series with the first. In the second digestion at least 8% NaOH and preferably 0.05–0.2% $MgSO_4$ are utilized for a digestion retention period of at least 20 minutes and a temperature of from 70° C. to 110° C. and $O_2$ partial pressure at least 65 psi with up to 120 psi being acceptable and from 0.5% to 2.0% $H_2O_2$. If a second digester tube is used, the mild alkaline digestion conditions can be varied between the two digesters. For example, oxygen can be injected to one or both digesters.

After the mild alkaline digestion with $O_2$ and $H_2O_2$ has been completed, the fiber pulp is then forced rapidly through a pressure differential from the digester pressure of at least 70 psig but less than 135 psig and at a temperature of less than 110° C. but above 70° C. and preferably at a pulp consistency of less than 8% into a blow tank. The upper temperature of about 110° C. is required to prevent significant flashing and associated pulp degradation during blowing. Accordingly the temperature should not be significantly above (i.e. >10° C.) the boiling point of water at the blow tank pressure. This decompression can be accomplished by discharging the fiber through a valve having digester pressure on one side and blow tank pressure of essentially atmospheric pressure (i.e., less than 18 psi) on the other side of the valve (valve 8 in FIG. 1). To obtain the desired consistency of less than 8%, water sufficiently warm so as not to cool the pulp slurry to less than about 70° C. is added to the digested pulp, preferably obtained counter-currently from a washing step downstream in the process sequence from the digester. The fiber is discharged into a vented blow tank while the digester is still at elevated pressures.

In the decompression stage into the blow tank, virtually all the inks, ash, and contaminants remaining in the mixture of waste paper are separated from the fiber with the aid of the alkali lignin surfactants and the turbulence of rapid decompression. After entering the blow tank, the fiber is promptly transferred to a washer to remove contaminants and dispersed chemicals. "Promptly transferred" means transferring the digested and blown pulp to the washer before the pulp has cooled to below about 70° C. and preferably the pulp is above 75° C. but less than 110° C. The wash water should be above about 70° C. so as not to cool the pulp below 70° C. and precipitate congealed contaminates known as "stickiest" back onto the fibers. To avoid precipitation of contaminates, the wash water should have a pH above 7. The hot water washed fibers are then preferably subjected to a high-consistency (2–4%) coarse and fine screening flotation, centricleaning and bleaching.

The bleaching of the digested, decompressed and washed fibers may be carried out using conventional papermaking equipment. A highly satisfactory bleaching sequence has been found to consist of successive treatments of the fiber with $Cl_2$, NaOH, and either NaOCl or $H_2O_2$. It may be desirable to buffer the final bleaching solution with alkali to prevent undue fiber viscosity loss due to excess acidity. Cleaning is preferably by flotation at low consistency (0.5–1.0%) with the fibers removed by froth flotation and then cleaned centrifugally. The fibers are then preferably given a final washing and thickened to the desired consistency for eventual processing into tissue-grade paper products or other paper requiring high quality fibers.

The unique combination of mild alkaline digesting with $O_2$ and $H_2O_2$ at elevated pressure followed by a decompression discharge and hot washing achieves the following:

a) delignifies high Kappa # fibers b) separates, dissolves, and modifies contaminants with the aid of lignin based surfactants to make contaminants removable by subsequent operations c) pulp's low Kappa # fibers without significant degradation.

9

The process of the present invention will now be further illustrated by the following examples.

EXAMPLE

In the examples, waste fibers were employed which had been obtained from a bale of Mixed Grades of Waste Cellulosic materials collected from commercial offices and from similar sources. The composition of the waste fiber was comprised primarily of 5% groundwood (Kappa #55), 5% magazines (Kappa #50), and 90% mixed waste paper containing high quality (low lignin) fibers such as laser/xerox and fax waste paper.

Example 1

The physical properties of a sample of waste fiber obtained from this bale, after shredding, washing, and oven-drying were as follows:

| | | |
|---|---|---|
| a. | Kappa Number (Ka#) | 5.2 |
| b. | Viscosity (cps) | 11.0 |
| c. | Brightness (ISO) | 68–70 |
| d. | Handsheet strength (g/m$^2$) | 59.7 |
| e. | Canadian Std. Freeness (csf) | 499 |
| f. | Breaking length (m) | 3622 |
| g. | TAPPI Tear (Factor) | 92 |
| h. | Mullen Burst Strength (psig) | 16 |
| i. | Specific Volume | 1.74 |
| j. | Dirt (Scott-Optomax V) | 1517 |

Physical property data was determined as described in TAPPI Standard t-220 m with exception of brightness which is ISO Standard Brightness (TAPPI)—t-218 m.

100 grams of an oven-dried fiber obtained from the bale of Mixed Grades of Waste Materials having the properties described above, was slushed in a hydro pulper with water, screened through a 0.008" flat screen and introduced into a pressure reactor (manufactured by Chemineer of Dayton, Ohio). The reactor has a volume capacity of 5 gallons and is encased with an insulator jacket which is supplied by high pressure steam as the means for heating. The removable top houses a stirrer shaft comprising a 9" diameter propeller at the end and a 4" paddle blade about 3" above the propeller. Said stirrer shaft, in turn, is connected to a controllable drive means. In addition to pulp slush, 2% caustic (NaOH) and 1% peroxide (based upon oven dried weight of the pulp) was added to result in a mix at a pulp consistency of 12%. The reactor is then pressurized with $O_2$ to 100 psig; the temperature raised to 90° C. and stirred at 75 rpm for a period of 30 minutes.

At this stage, delignification is occurring within the reactor under mild alkaline conditions on the various fractions of waste fiber wherein the high Kappa # fibers consume substantially all of the chemical to further delignify while at the same time releasing solubilized alkali lignin surfactants.

At the end of the 30 minute cook period, warm water was added to dilute the pulp to a consistency of about 6% most suitable for blowing (rapid decompression). Because the pilot plant did not have the capability of injecting warm water into the pressurized reactor, the $O_2$, pressure was shut off and the reactor pressure was reduced by releasing the internal pressure through a relief valve also housed in the reactor lid to below that of the incoming warm water at 172° F. (78° C.). The reactor was repressurized with compressed air to 80 psig before the blow valve located at the bottom of the reactor was opened to initiate rapid decompression of fiber through the blow valve while still hot (+172° F.) from alkali digestion.

10

The blow valve has at the discharge side a one inch (ID) tube measuring 5.5 ft. long (steel encased) extending from the bottom of the reactor which terminates near the center of the adjacent blow tank. When the blow valve was opened the pulp exited the reactor and underwent rapid depressurization from about 80 psig to essentially atmospheric pressure in the vented blow tank.

The rapid decompression of pulp was at high velocity and turbulence. The blow value was then shut off before all of the pulp was discharged so that some unblown pulp could be obtained for comparison. The reactor vessel was vented, and opened and non-blown pulp was removed for comparison with the pulp in the blow tank. The blow tank was at atmospheric pressure with the top lid bolted down so that liquid containing water, lignin and contaminants exited through the bottom of the tank through a large opening about 4" in diameter.

Samples of both the blown pulp and the unblown pulp while still hot were separately washed with hot water (above 170° F.) and subjected to bleaching, washing and flotation processes as follows:

The pulp was washed a second time with warm water, cleaned in a flotation step with 0.25% of a flotation aid (Berocell 204, a nonionic surfactant) at 1% consistency and 95° F. (35° C.) for 4 minutes, then bleached at 10% consistency for 180 minutes at 180° F. (82.2° C.) with 1% $ClO_2$ and then again cleaned in an identical flotation step as before. The results are in Table II. Dirt was measured according to the Scott Optomax V Method (developed by Scott Paper Company) as follows:

SCOTT OPTOMAX V METHOD

The basic method of making the measurements is to place the sample (usually a 3 g handsheet) on the specimen table, measure 5 areas or field (a field being about 18 cm) on each side of the sample, and the number of particles (count) and the total are occupied by those particles for each field are determined by an Optomax V Image Analyzer obtained from Optomax, located at 169 Terrace Hall, Burlington, Mass. 01803.

Five such handsheets are measured for a total of 50 fields.

Typically the fields are taken at the top, bottom, left, right, and center of each handsheet.

The configuration menu for the Optomax is as follows:

| MENU TITLE | SETTING |
|---|---|
| Video Input | Camera 1 |
| Video Mode | True |
| Shade Correction | Dynamic |
| Hole Fill | Off |
| Printer | Off |
| Display Mode | Feature Count |
| Measurement Mode | Field |
| Initiate Mode | Single |
| Detector Mode | A |
| Detector a Setting | Direct 180 |
| Calibration Title | Dirt 1 |
| Calibration Factor | 0.153508 |
| Calibration Units | MM/PIXEL |
| Frame Selected | Rectangle |

Reflected light is used throughout the measurement.

RESULTS OF EXAMPLE I

The brightness and viscosity properties are similar for both blown and unblown pulp after flotation (F), chlorine dioxide bleaching (D) and flotation steps (FDF) but a significant improvement is observed in the reduction of dirt and stickies content as recorded in the data in Table II.

TABLE II

| Pulp Sample | Without Blow | With Blow | Control |
|---|---|---|---|
| FIBER PROPERTIES | | | |
| CSF Corrected (cc)[1] | 415 | 441 | 528 |
| Kajaani Fl (mm)[2] | 0.86 | 0.95 | 1.11 |
| Coarseness (mg/100M) | 17.5 | 13.4 | 11.6 |
| HANDSHEET STRENGTH | | | |
| Basis Wt. (gm/sq.M) | 58.1 | 58.2 | 58.7 |
| Breaking Len. (M) | 3659 | 4136 | 3622 |
| TAPPI Tear (Factor) | 63.68 | 64.15 | 92 |
| Mullen Bst (psig) | 16.63 | 16.50 | 16 |
| Mullen Bst (Factor) | 20.12 | 19.93 | 19 |
| HANDSHEET CAPACITIES | | | |
| Specific Volume (cc/gm) | 1.56 | 1.66 | 1.74 |
| TWA (gm/gm) | 2.57 | 2.50 | |
| BRIGHTNESS (ISO) | | | 67 |
| After F[3] D[4] | 84.0 | 84.2 | |
| After F D F | 84.7 | 84.8 | |
| Viscosity, cps | 10.2 | 9.6 | 11.0 |
| DIRT at Beginning | | | 1517 |
| DIRT after F D F Steps | | | |
| Total Count/m | 731.74 | 395.6 | |
| Dirt Area, ppm | 111.96 | 31.2 | |
| TAPPI Dirt Area, ppm | 106.26 | 29.4 | |
| STICKIES after F D F Steps | | | |
| Total Count/m | 395.56 | 237.34 | |
| Dirt Area, ppm | 32.62 | 27.03 | |
| TAPPI Dirt Area, ppm | 29.74 | 24.64 | |
| KAPPA # | | | |
| At Start | | | 5.2 |
| After Mild Cooking | 0(ND) | 0(ND) | |

[1]Canadian Standard Freeness
[2]Fiber Length - Millimeters
[3]F equals flotation step
[4]D is chlorine dioxide bleaching step

Example 2

The physical properties of a sample of waste fiber obtained from the same bale as Example I, after shredding, washing, and oven-drying were as follows:

| | | |
|---|---|---|
| a. Kappa Number (Ka#) | | 14.2 |
| b. Brightness (ISO) | | 48.2 |
| c. Handsheet strength (g/m²) | | 58.6 |
| d. Canadian Std. Freeness (csf) | | 463 |
| e. Breaking length (m) | | 4175 |
| f. TAPPI Tear (Factor) | | 126.28 |
| g. Mullen Burst Strength (psig) | | 19.88 |
| h. Specific Volume | | 1.97 |
| i. Dirt (Scott-Optomax V) | | 8198 |

Physical property data determined as described in TAPPI Standard t-220 m with exception of brightness which is ISO Standard Brightness (TAPPI)—t-218 m and dirt which was according to Scott Optimax V.

Example 2 was conducted under the same conditions as Example 1 except, digestion was increased to 45 minutes and the bleaching treatment was a sequence of chlorine (1.2% Cl$_2$), extraction (0.63% NaOH) and hypochlorite (0.55% NaOCl). The results are given in Table III.

TABLE III

| Pulp Sample | Without Blow | With Blow | Control |
|---|---|---|---|
| FIBER PROPERTIES | | | |
| CSF Corrected (cc)[1] | 319 | 307 | 463 |
| Kajaani Fl (mm)[2] | 1.19 | 1.21 | 1.29 |
| HANDSHEET STRENGTH | | | |
| Basis Wt. (gm/sq.M) | 59.4 | 60.9 | 58.6 |
| Breaking Len. (M) | 4,098 | 3,833 | 4,175 |
| TAPPI Tear (Factor) | 116.16 | 124.8 | 125.38 |
| Mullen Bst (psig) | 23.88 | 23.63 | 19.88 |
| Mullen Bst (Factor) | 28.26 | 27.27 | 23.85 |
| HANDSHEET CAPACITIES | | | |
| Specific Volume (cc/gm) | 1.73 | 1.67 | 1.97 |
| TWA (gm/gm) | 3.37 | 3.11 | 3.29 |
| BRIGHTNESS (ISO) | | | |
| After F[3] D[4] | 55.9 | 56.5 | |
| After F D F | 83.5 | 83.4 | |
| DIRT at Initial Beginning | | | |
| Total Count/m | | | 66,053.95 |
| Dirt Area, ppm | | | 8,198.06 |
| TAPPI Dirt Area, ppm | | | 7,846.76 |
| DIRT after (EOP) CEH[F] | | | |
| Total Count/m | 756.51 | 909.8 | 66,053.95 |
| Dirt Area, ppm | 94.03 | 92.3 | 8,198.06 |
| TAPPI Dirt Area, ppm | 89.1 | 87.62 | 7,846.76 |
| STICKIES after CEH[F] | | | In Orig.Mix Initial |
| Total Count/m | 771.4 | 593.3 | 7,240.0 |
| Dirt Area, ppm | 54.53 | 34.96 | 309.0 |
| TAPPI Dirt Area, ppm | 44.74 | 27.96 | 156.6 |
| KAPPA # | | | |
| Initial | | | |
| After Mild Cooking | 6.2 | 6.2 | 14.2 |

[1]Canadian Standard Freeness
[2]Fiber Length - Millimeters
[3]F equals flotation step
[4]CEH is bleaching sequence consisting of chlorine, caustic & hypochlorite

We claim:

1. A recycling process for producing high quality fibers from Mixed Grades of Waste Cellulosic Material that reduces the Kappa # by at least 50%, bleaches the fibers and cleans the fibers, and reduces the amount of stickies present on said fibers, said recycling process comprising the steps of:

a. making a pulp slurry from said Material by adding thereto a sufficient amount of water to produce a slurry having a pulp consistency of at least 10%;

b. adjusting the pH of said slurry to between 9.5 and 12.0 and adding from 0.5% to 2.5% peroxide to the slurry;

c. digesting said pulp slurry in a pressurized digester for at least 30 minutes at a temperature from 70° C. to 110° C., at a total pressure less than 135 psig and above 70 psig, at an oxygen partial pressure greater than 65 psi and under mild alkaline conditions corresponding to a pH for the slurry between 9.5 and 12 throughout the digestion, to bleach the fibers, solubilize lignin to produce soluble alkali lignin surfactants in the slurry and reduce the Kappa # of said pulp by at least 50%;

d. forming a reduced consistency pulp slurry by adding a sufficient amount of water to said digested pulp slurry to reduce the consistency of the pulp slurry to less than 8%, said water being sufficiently warm so as not to cool the pulp slurry below 70° C.;

e. subjecting the reduced consistency pulp slurry to a rapid decompression by discharging the reduced consistency pulp slurry from said digester at a temperature below 110° C. and above 70° C. and at a discharge pressure between 70 psig and 135 psig into a receiving vessel sufficiently vented to maintain a pressure of less than 18 psi within said receiving vessel during said discharging of pulp into said vessel which separates virtually all of the stickies from the fibers;

f. separating pulping liquor containing lignin based surfactants and contaminants from said pulp; and g. washing said pulp with water at a temperature above 70° C. and a pH above 7 before said discharged pulp has cooled to a temperature below 70° C. in order to avoid precipitation of the stickies back onto said fibers.

2. The process of claim 1 wherein the pulp slurry of step (a) is pretreated prior to subjecting the slurry to the treatment in step (b) as follows:

adjusting the pH of said slurry of step (a) to between 8 and 11 and heating the slurry to a temperature from 40° C. to 70° C. for at least 10 minutes prior to the addition of peroxide.

3. The process of claim 1 wherein said water is added in a sufficient amount to produce a slurry having a pulp consistency of 15% to 40%.

4. The process of claim 1 wherein said water is added in a sufficient amount to produce a slurry having a pulp consistency of 25% to 35%.

5. The process of claim 1 wherein said reduced consistency pulp slurry is formed by adding a sufficient amount of water to said digested pulp slurry to reduce the consistency of the pulp slurry to 5% to 8%.

6. The process of claim 1 wherein said water is added in a sufficient amount to produce a slurry having a pulp consistency of 15% prior to digesting said slurry.

7. The process of claim 1 wherein there is a 60 psi or above pressure differential between the total pressure during said digesting step and the pressure within said receiving vessel.

8. The process of claim 1 wherein said total pressure during said digesting step is 70 psig to 120 psig.

9. The process of claim 1 wherein said oxygen partial pressure is from 80 psi to 100 psi.

10. A recycling process for producing high quality fibers from Mixed Grades of Waste Cellulosic Material that reduces the Kappa # by at least 50%, bleaches the fibers and cleans the fibers, and reduces the amount of stickies present on said fibers, said recycling process comprising the sequential steps of:

a. forming a pulp slurry of said Material with a pulp consistency of at least 10%;

b. digesting said pulp slurry in the presence of oxygen and peroxide and at a pH of between 9.5 and 12 throughout digestion, said digestion occurring at a total pressure above 70 psig and at a sufficient temperature and for a sufficient time period to bleach the fibers, solubilize lignin to produce soluble alkali lignin surfactants in the slurry, and reduce the Kappa # of said pulp by at least 50%;

c. reducing the consistency of said pulp slurry with water after digestion to less than 8% while maintaining the temperature of said slurry at or above 70° C.;

d. rapidly decompressing the pulp slurry at a temperature equal to or above 70° C. and at a discharge pressure that is at least 60 psig less than the total pressure during said digesting which separates virtually all of the stickies from the fibers;

e. separating pulping liquor containing lignin based surfactants and contaminants from said pulp and washing said pulp with water at a temperature of at least 70° C. and at a pH above 7 before allowing the digested and rapidly decompressed pulp to cool to a temperature below 70° C. so that precipitation of the stickies back onto said fibers is avoided.

11. The process of claim 10 wherein the pulp slurry is pretreated prior to the digesting step, said pretreating comprising the step of heating said slurry to a temperature between 40° C. and 70° C. at a pH of between 8 and 11 for at least 10 minutes.

* * * * *